US011344957B2

(12) United States Patent
Xi et al.

(10) Patent No.: US 11,344,957 B2
(45) Date of Patent: May 31, 2022

(54) KEY PROCESSING MACHINE

(71) Applicant: Zhejiang Yongyuan Technology Co., Ltd, Yuyao (CN)

(72) Inventors: Yongfeng Xi, Shenzhen (CN); Junfeng Chen, Shenzhen (CN)

(73) Assignee: Zhejiang Yonguan Technology Co., Ltd, Yuyao (CN)

( * ) Notice: Subject to any disclaimer, the term of this patent is extended or adjusted under 35 U.S.C. 154(b) by 180 days.

(21) Appl. No.: 16/894,574

(22) Filed: Jun. 5, 2020

(65) Prior Publication Data

US 2020/0406417 A1    Dec. 31, 2020

(30) Foreign Application Priority Data

Jun. 27, 2019   (CN) .......................... 201910569781.9

(51) Int. Cl.
*B23C 3/35*      (2006.01)
*B23Q 35/28*      (2006.01)

(52) U.S. Cl.
CPC ................ *B23C 3/35* (2013.01); *B23Q 35/28* (2013.01); *Y10T 409/300952* (2015.01); *Y10T 409/303416* (2015.01)

(58) Field of Classification Search
CPC ...................... B23C 3/35; B23C 3/355; B23C 2235/00–048; B23Q 35/04; B23Q 35/10; B23Q 35/28; B23Q 2735/04; B23Q 2735/045; Y10T 409/300952; Y10T 409/301008; Y10T 409/301064; Y10T 409/303416; Y10T 409/303472

USPC ............................... 409/81, 82, 83, 125, 126
See application file for complete search history.

(56) References Cited

U.S. PATENT DOCUMENTS

| | | | | | |
|---|---|---|---|---|---|
| 3,116,665 | A | * | 1/1964 | Reisner | ..................... B23C 3/35 409/83 |
| 3,150,561 | A | * | 9/1964 | Celli | ..................... B23Q 35/10 409/118 |
| 4,251,173 | A | * | 2/1981 | Saucedo | ..................... B23C 3/35 29/76.2 |

(Continued)

FOREIGN PATENT DOCUMENTS

| | | | | |
|---|---|---|---|---|
| CN | 106694742 A | | 5/2017 | |
| JP | 63062646 A | * | 3/1988 | ............. B23Q 35/24 |

(Continued)

*Primary Examiner* — Boyer D Ashley
*Assistant Examiner* — Michael Vitale
(74) *Attorney, Agent, or Firm* — Myers Wolin, LLC

(57) ABSTRACT

A key processing machine is described comprising an automatic cutter change device, a key shape learning device, a clamp component and a base. The automatic cutter change device comprises a frame structure, a cutter head, a rotary disc and a first motor unit. The rotary disc is fitted with a plurality of chambers used to accommodate the said cutter head. The cutter head is installed in the said chambers. The rotary disc and the first motor unit are installed on the said frame structure, and the said first motor unit drives the said rotary disc to rotate and further drive the cutter head on the said rotary disc to rotate. The automatic cutter change device or the key shape learning device matches the clamp component to put the original key and the key blank for processing in the clamp component, saving human resources and increasing working efficiency.

10 Claims, 3 Drawing Sheets

(56) References Cited

U.S. PATENT DOCUMENTS

| | | | | |
|---|---|---|---|---|
| 4,687,389 A * | 8/1987 | Santii | ............ | B23C 3/35 |
| | | | | 409/81 |
| 5,908,273 A * | 6/1999 | Titus | ............ | B23C 3/35 |
| | | | | 409/81 |
| 6,152,662 A * | 11/2000 | Titus | ............ | B23C 3/35 |
| | | | | 409/132 |
| 9,669,476 B2 * | 6/2017 | Donadini | ............ | B23C 3/35 |
| 2004/0175246 A1 * | 9/2004 | Wu | ............ | B23C 3/35 |
| | | | | 409/81 |
| 2007/0105484 A1 * | 5/2007 | Parillo | ............ | B23C 3/35 |
| | | | | 451/28 |
| 2015/0224584 A1 * | 8/2015 | Parillo | ............ | B23C 3/355 |
| | | | | 451/238 |

FOREIGN PATENT DOCUMENTS

| | | | | | |
|---|---|---|---|---|---|
| JP | 04019007 A | * | 1/1992 | ............ | B23C 3/35 |
| WO | WO-2012016934 A1 | * | 2/2012 | ............ | B23C 3/35 |

* cited by examiner

KEY PROCESSING MACHINE

CROSS REFERENCE TO RELATED APPLICATIONS

The present application claims priority of the Chinese patent application No. CN 201910569781.9, filed on Jun. 27, 2019. The entire contents of the above-cited application are hereby incorporated by reference in their entirety for all purposes.

FIELD OF THE INVENTION

This disclosure relates to a key processing, particularly a key processing machine.

BACKGROUND

It is well established that keys are a necessity in people's daily lives and they are often damaged or lost. Therefore, it is often necessary to duplicate keys. At present, the common key processing machines are principally divided into mechanical key processing machines and electronic key processing machines. A mechanical key processing machine essentially comprises a detector that detects the profile of the original key, and the machine will then employ a milling cutter to process the key blank; an electronic key processing machine mainly replaces the detector with an optical reader.

When duplicating keys of different types or with different bitting codes, these two types of key processing machines will usually require benchmark positioning or artificial change of the cutter. In the context of a rising level of industrialization and the pursuit of intelligent manufacturing, the production efficiency of the various mechanical or electronic key processing machines currently available can no longer satisfy the needs of today, and some production steps also involve human labour, which will lead to a huge waste of human resources.

Patent application CN106694742A1 describes the novel key machine. The machine comprises a rotary disc, a vibrating disc, two perforating machines and six clamps, wherein the rotary disc is in transmission connection with a driving device, the vibrating disc is arranged around the rotary disc in a surrounding mode, and the six clamps are in transmission connection with a cylinder.

The first clamp is in transmission connection with the vibrating disc. The second clamp is in transmission connection with the first perforating machine. The third clamp is in transmission connection with the second perforating machine. The fourth clamp is in transmission connection with a punch press. The fifth clamp is in transmission connection with a rolling machine. The sixth clamp is in transmission connection with a discharging box. The first clamp is fixedly arranged on the rotary disc and is opposite to the vibrating disc. The second clamp is fixedly arranged on the rotary disc and is opposite to the first perforating machine. The third clamp is fixedly arranged on the rotary disc and is opposite to the second perforating machine. The fourth clamp is fixedly arranged on the rotary disc and is opposite to the punch press. The fifth clamp is fixedly arranged on the rotary disc and is opposite to the rolling machine. The sixth clamp is fixedly arranged on the rotary shaft and is opposite to the discharging box. The novel key machine achieves full-automatic machining of keys, improves labor productivity, saves energy, is environmentally friendly, high in energy efficiency and low in cost, and has broad market economic benefits.

SUMMARY

The main purpose of this invention is to provide a key processing machine that can increase manufacturing efficiency and save human resources.

To attain this purpose, this invention discloses the following technical solution:

A key processing machine, which comprises an automatic cutter change device, a key bitting code learning device, a clamp component and a base.

The said automatic cutter change device comprises a frame structure, a cutter head, a rotary disc and a first motor unit. The said rotary disc is fitted with a plurality of chambers used to accommodate the said cutter head; the said cutter head is installed in the said chambers. The said rotary disc and the first motor unit are installed on the said frame structure, and the said first motor unit drives the said rotary disc to rotate and further drive the cutter head on the said rotary disc to rotate.

The said key bitting code learning device comprises a cutter disc measuring head and a first drive component: one end of the said cutter disc measuring head is used to bring the contact part into contact with the original key bit, while the said first drive component drives the said cutter disc measuring head to move and further drive the said contact part to make contact with or break away from the said bit of the original key.

The said clamp component comprises a second motor unit and a fixing device: the said fixing device is used to hold in place the said original key or the key blank that needs processing, and the said second motor unit drives the said fixing device to move on a horizontal plane.

The said base is fitted with the said automatic cutter change device, the said automatic cutter change device and the said key bitting code learning device: the said automatic cutter change device and the said key bitting code learning device are arranged on either side of the said clamp component so that the said automatic cutter change device or the said key bitting code learning device will learn the shape of the said original key positioned on the said clamp component, or process the said key blank positioned on the said clamp component to be processed.

Further, the said automatic cutter change device also comprises a slide base plate, a slide board and a base. The said first motor unit comprises a first motor, a second motor, a third motor and a fourth motor. The said cutter head comprises a learning cutter head and a processing cutter head.

The said base is fitted with a slide groove, and the said slide board slides in the said slide groove. The said fourth motor is installed on the said base, the said frame structure is installed on the rear side of the said slide board, and the drive axis of the said fourth motor is connected to the said frame structure. The said fourth motor drives the said frame structure to make the said slide board slide up and down along the said slide groove, and the said rotary disc is installed on the front side of the said slide board.

The said second motor is installed on the said frame structure. The drive axis of the said second motor is equipped with a driving gear, and the rear end of the said rotary disc is equipped with a driven gear matching the said driving gear. The said driving gear engages with the said driven gear, the said second motor drives the said driving gear to rotate, and the said driving gear drives the said driven gear to make the said rotary disc rotate. The said third motor is installed on the said frame structure, the said slide base plate slides on the said frame structure, the drive axis of the third motor is connected to the said slide base plate, and the said third motor drives the said slide base plate to slide on the said frame structure. The said first motor is installed on the said slide base plate. The front end of the said rotary disc is provided with a plurality of axis head chambers; inside every axis head chamber is an axis head. One end of the said axis head is fitted with a learning cutter head that will learn the said original key shape and a processing cutter head that will process the said key blank; the other end of the said axis head is fitted with an external spline. The drive axis of the said first motor is fitted with an internal spline matching the said external spline; the said external spline and the said internal spline work together so that the said first motor will drive the corresponding processing cutter head to work.

Further, when the said third motor drives the said slide base plate to slide in the first direction, the said internal spline will disengage from the said external spline, and the said second motor drives the said rotary disc to rotate so that the external spline in one of the multiple axis head chambers will correspond to the internal spline of the said first motor.

Further, when the said third motor drives the said slide base plate to slide in the second direction, which is the direction opposite to the first direction, the said external spline will engage the corresponding internal spline. The said first motor drives one corresponding cutter head to work, and the said fourth motor drives the said slide base plate to slide in the said slide groove so that one corresponding cutter head will process the key.

Further, the said first drive component comprises a first axis, a first drive mechanism and a fifth motor: the said fifth motor drives the said first axis to rotate through the said first drive mechanism. One end of the said cutter disc measuring head is connected to the said first axis, and the other end comprises a contact part used to collect tooth shape data of the original key. When the said first axis drives the said cutter disc measuring head to move, the said contact part will move back and forth between the position matching the original key and the position away from the original key.

Further, the said first drive component also comprises an axis cover and an end surface gear.

The said axis cover is fixed around the said first axis: the end surface at one end of the said axis cover is a tooth shape end surface that matches the tooth shape of the said end surface gear.

One end of the said end surface gear is rigidly connected to the said cutter disc measuring head and the end surface at the other end abuts the tooth shape end surface of the said axis cover.

Further, the said first drive mechanism comprises a rotary cam, a drive block and a gear.

The said drive block comprises a nesting part and a tooth shape part: the said nesting part is flexibly arranged along the perimeter of the said rotary cam, the said rotary cam is rigidly arranged at one end of the axial centre of the said fifth motor, the said tooth shape part matches and occludes the tooth shape of the said gear, and the said gear is rigidly connected to the said first axis.

Further, the said drive block comprises a semi-arc end surface.

The said nesting part consists of two clamping arms that stretch outward from the said drive block.

The said tooth shape part consists of a semi-arc end surface of the said drive block protruding outward and the tooth shape of the said gear.

Further, the said fixing device comprises a first movable bench, a second movable bench and a fixing clamp used to hold in place the said original key or the key blank that needs processing; the said fixing clamp is fixed on the said first movable bench, the said first movable bench is flexibly installed on the said second movable bench, and the said second movable bench is flexibly mounted on the said base.

When the said first movable bench moves left or right along the said second movable bench in the horizontal direction to approach or break away from the said key bitting code learning device, it will drive the said fixing clamp to move in the horizontal direction.

When the said second movable bench moves back and forth in the horizontal direction of the said base, it will drive the said first movable bench and the said fixing clamp to move.

Further, the said fixing clamp comprises a first clamp and a second clamp.

The said first clamp clamping the said original key or the said key blank that needs processing corresponds to the said key bitting code learning device through the said first movable bench and the said second movable bench, in order for the said key bitting code learning device to learn the said original key shape and then process the said key blank that needs processing.

The said second clamp clamping the other said original key or the said key blank that needs processing corresponds to the said automatic cutter change device through the said first movable bench and the said second movable bench, in order for the said automatic cutter change device to learn the other said original key shape and then process the said key blank that needs processing.

One key processing machine provided by this invention has the following benefits: the automatic cutter change device or the key bitting code learning device matches the clamp component to put the original key and the key blank for processing in the clamp component; the key bitting code learning device or the automatic cutter change device learns the tooth shape of the original key and then processes the key blank that needs processing, in order to process different types of keys, thereby saving human resources and increasing working efficiency.

Figure 1:
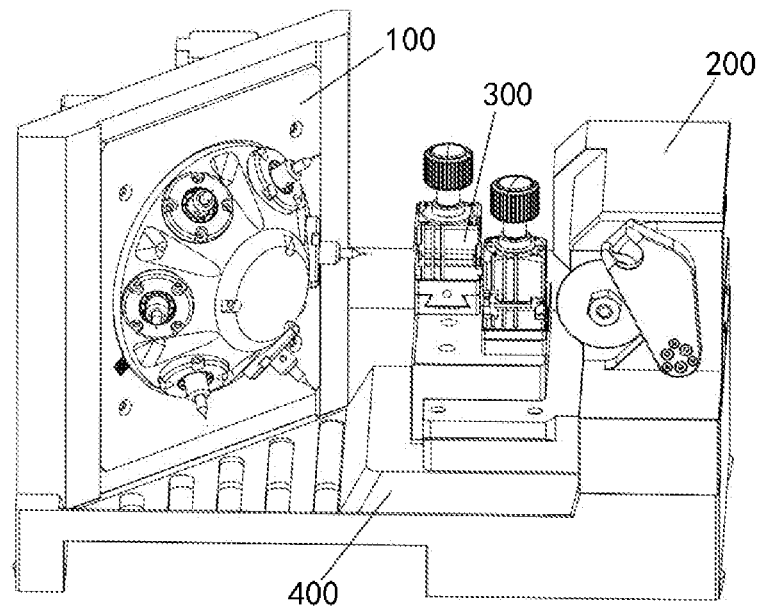
FIG. 1 shows a schematic diagram for the structure of a key processing machine under this invention in a preferred embodiment.

The purpose, realization, functional characteristics and advantages of this invention will be further described with the preferred embodiment and the attached drawings.

DETAILED DESCRIPTION OF THE PREFERRED EMBODIMENTS

The description of illustrative embodiments according to principles of the present disclosure is intended to be read in connection with the accompanying drawings, which are to be considered part of the entire written description. In the description of embodiments of the solution disclosed herein, any reference to direction or orientation is merely intended for convenience of description and is not intended in any way to limit the scope of the present disclosure. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the solution are illustrated by reference to the exemplified embodiments. Accordingly, the solution expressly should not be limited to such exemplary embodiments illustrating some possible non-limiting combination of features that may exist alone or in other combinations of features; the scope of the disclosure being defined by the claims appended hereto.

This disclosure describes the best mode or modes of practicing the solution as presently contemplated. This description is not intended to be understood in a limiting sense, but provides an example of the disclosure presented solely for illustrative purposes by reference to the accompanying drawings to advise one of ordinary skill in the art of the advantages and construction of the solution. In the various views of the drawings, like reference characters designate like or similar parts.

It should be understood that the specific preferred embodiment described here is only intended to interpret this solution, but not used to limit this solution.

Next, we will use the attached drawings of the preferred embodiment of this disclosure to describe the technical design for the preferred embodiment of this solution in a clear and integral manner. Obviously, the preferred embodiment described here represents only one, and not all preferred embodiments of this solution. Any other preferred embodiment designed by ordinary technical staff in the area, based on the preferred embodiment of this solution and without creative labour, shall fall under the scope of protection of this invention.

It must be stated that all directional indicators in the preferred embodiment of this solution (such as up, down, left, right, front and back) are only used to describe relative spatial relations and motion statuses between various parts from a specific viewpoint (as illustrated in the attached drawings). If this specific viewpoint changes, such directional indicators will change accordingly, and the said connections may be direct connections.

In addition, "first", "second" and other descriptions used in this solution are only used to describe purposes and shall not be deemed to indicate or imply their relative importance or specify the number of indicated technical features in an implicit manner Therefore, the features indicated with "first" or "second" can explicitly or implicitly contain at least one such feature. In addition, technical designs for different preferred embodiments can be combined with one another, provided that such a combination can be realized by ordinary technical staff in the area. When the combination between technical designs incurs a mutual conflict or is unrealizable, such a combination of technical designs shall be considered as not existing or falling under the scope of protection required by this disclosure.

It should be understood that the concrete preferred embodiment described here is only intended to interpret this invention, but not used to limit this invention.

Technical staff in the technical area can understand that unless otherwise specified, the singular forms like "one", "said", "aforesaid" and "such" used herein can also include their respective plural forms. It should be further understood that the expression "include" used in this invention specification means there are said characteristics, integer numbers, steps, operations, elements, units and/or components, but it is not ruled out that one or more other characteristics, integer numbers, steps, operations, elements, units, components and/or their assemblies may exist or be added. It should be understood that when we say an element is "connected" or "coupled" with another element, it can be connected or coupled with the other element either directly or through an intermediate element that may exist. Besides, "connection" or "coupling" used here can include wireless connection or wireless coupling. The expression "and/or" used here includes one or a plurality of related listed items, or any unit and all combinations thereof.

Technical staff in the technical area can understand that unless otherwise specified, all terms (including technical terms and scientific terms) used herein shall have the same meanings that ordinary technical staff in the area of this invention generally understand. It should also be noted that those terms defined in the general dictionary shall be understood as having the meanings that are in use in the context of the existing technology, and they will not be interpreted with ideal or very formal meanings, unless otherwise specifically defined herein.

FIG. 1-7 illustrates a key processing machine, which comprises an automatic cutter change device 100, a key bitting code learning device 200, a clamp component 300 and a base 400.

The automatic cutter change device 100 comprises a frame structure 2, a cutter head 4, a rotary disc 3 and a first motor unit. The rotary disc 3 is provided with a plurality of chambers 17 used to accommodate the cutter head 4; the cutter head 4 is installed in the chambers 17. The rotary disc 3 and the first motor unit are installed on the frame structure 2, and the first motor unit drives the rotary disc 3 to rotate and further drives the cutter head on the rotary disc 3 to rotate.

The key bitting code learning device 200 comprises a cutter disc measuring head 21 and a first drive component: one end of the cutter disc measuring head 21 is used to bring the contact part 23 into contact with the original key bit, while the first drive component drives the cutter disc measuring head 21 to move and further drive the contact part 23 to make contact with or break away from the said bit of the original key.

The clamp component 300 comprises a second motor unit and a fixing device: the fixing device is used to hold in place the original key or the key blank that needs processing, and the second motor unit drives the fixing device to move on a horizontal plane.

The base 400 is fitted with the clamp component 300, the automatic cutter change device 100 and the key bitting code learning device 200: the automatic cutter change device 100 and the key bitting code learning device 200 are arranged on either side of the clamp component 300 so that the automatic cutter change device 100 or the key bitting code learning device 200 will learn the shape of the original key positioned on the clamp component 300, or process the key blank positioned on the said clamp component 300 to be processed.

The key bitting code learning device 200 learns the shape of the original key and matches collected tooth shape data with the bitting code stored in the database in advance, in order to find the cutter head that corresponds to the bitting code. After a successful match, it further drives the automatic cutter change device 100 to rotate and process the key blank that needs processing with the corresponding cutter head.

In this preferred embodiment, the key processing machine is composed of a plurality of components, including the automatic cutter change device 100 that can learn the shape of the original key and freely change the cutter, the key bitting code learning device 200 that collects the original key tooth shape data and automatically processes the key blank, and the clamp component 300 that holds the original key and the key blank in place. The key bitting code learning device 200 comprises a processing cutter disc used to process the key blank. The cutter disc measuring head learns the tooth shape data of the original key and uses the processing cutter disc to process the blank key that needs processing, thereby producing a duplicated key that is the same as the original key. The automatic cutter change device 200 can also learn the tooth shape of the original key with the learning cutter head, and then use the processing cutter head to process the key blank that needs processing, thereby producing a duplicated key that is the same as the original key. In particular, the original key or the key blank must be fixed on the clamp component 300 when either the key bitting code learning device 200 or the automatic cutter change device 100 is used to learn the original key shape or process the key blank that needs processing.

The automatic cutter change device 100 comprises a frame structure 2, a rotary disc 3, a cutter head 7 installed on the rotary disc 3 and a first motor unit, where the rotary disc 3 is provided a plurality of chambers 17 that can accommodate the cutter head 4 along the centre line. Different types of cutter heads 7 are installed in the chambers 17, and the rotary disc 3 is driven to rotate through the first motor unit, thereby driving the cutter head 4 on the rotary disc 3 to rotate and switch between different cutter heads 4 in order to process the key blank.

The key bitting code learning device 200 comprises a cutter disc measuring head 21 that collects the original key tooth shape data and a first drive component: one end of the cutter disc measuring head 21 is used to bring the contact part 23 into contact with the original key bit, while the first drive component drives the cutter disc measuring head 21 to move so that the contact part 23 will move back and forth to make contact with or break away from the bit of the original key, and record the tooth shape data of the original key. The processing cutter disc of the key bitting code device 200 performs coarse processing and fine processing of the key blank that needs processing based on the tooth shape data to produce a duplicated key that is the same as the original key.

The clamp component 300 comprises a second motor unit and a fixing device: the fixing device is used to hold in place the original key or the key blank that needs processing; the rotary disc faces the clamp component 300 so that the cutter head faces the clamp component 300. The clamp component 300 and the key bitting code learning device 200 are both arranged on the base 400. In detail, the automatic cutter change device 100 and the key bitting code learning device 200 are arranged on either side of the clamp component 300, the original key or the key blank that needs processing is fixed on the clamp component 300, and the automatic cutter change device 100 can learn and process the keys to get a duplicated key that is the same as the original key. Besides, the machine can also use the key bitting code learning device 200 to learn the shape of the original key positioned on the clamp component 300 and process the key blank that needs processing to get a duplicated key that is the same as the original key. One key processing machine has two key processing modes that can clamp different types of keys and employ different learning methods and processing methods to make the duplicated key that is the same as the original key.

Figure 2:
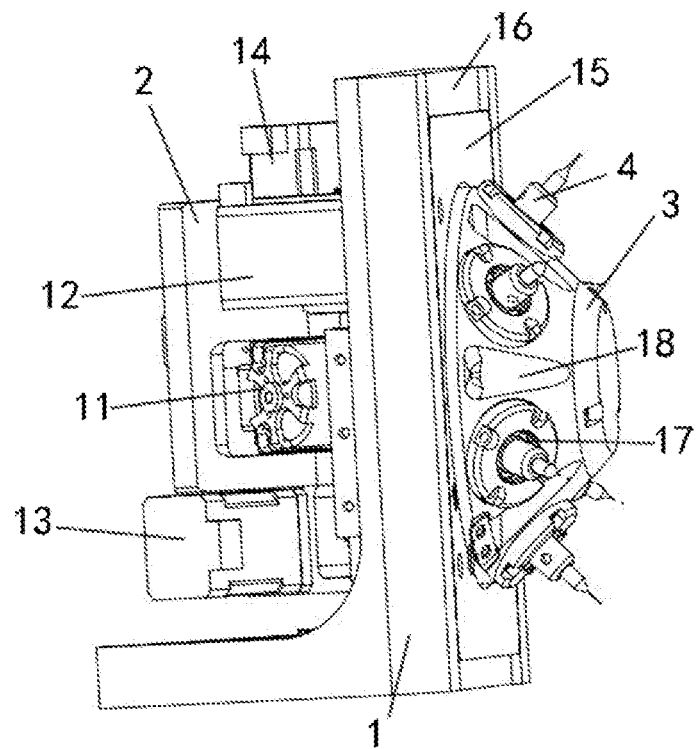
FIG. 2 shows a schematic diagram for the structure of the automatic cutter change device under this invention in a preferred embodiment.

As illustrated in FIG. 2, in this processing cutter head, the automatic cutter change device 100 also comprises a slide base plate, a slide board 15 and a base 1. The first motor unit comprises a first motor 11, a second motor 12, a third motor 13 and a fourth motor 14. The cutter head 4 comprises a learning cutter head and a processing cutter head. The base 1 is fitted with a slide groove 16, and the slide board 15 slides in the slide groove 16. The fourth motor 14 is installed on the base 1, the frame structure 2 is installed on the rear side of the slide board 15, and the drive axis of the fourth motor 14 is connected to the frame structure 2. The fourth motor 14 drives the frame structure 2 to make the slide board slide 15 up and down along the slide groove 16, and the rotary disc 3 is installed on the front side of the slide board 15. While the fourth motor 14 drives the slide board 15 to slide, the frame structure 12 installed on the slide board 15 will be simultaneously driven. In this preferred embodiment, the upper end and the lower end of the slide groove constitute an opening structure; the upper end and the lower end of the slide board 15 can protrude out of the upper end and the lower end of the slide groove respectively and be exposed outside the slide groove.

In this preferred embodiment, the slide board 15 is rectangular.

The frame structure 2 has a convex part, and the convex part crosses the slide board 15 to connect the rotary disc 3. In particular, the slide groove is provided with a first through hole that allows the convex part to pass through, the rear end of the rotary disc 3 is provided with a first groove, the convex part passes through the first through hole and is connected to the first groove. The rotary disc 3 rotates along the convex part as the axial centre.

The second motor 12 is installed on the frame structure 2. The drive axis of the second motor 12 is equipped with a driving gear, and the rear end of the rotary disc 3 is equipped with a driven gear matching the driving gear. The driving gear engages with the driven gear, the second motor 12 drives the driving gear to rotate, and the driving gear drives the driven gear to make the rotary disc rotate. The second motor 12 is arranged on the frame structure 12. Thus, when the fourth motor 14 drives the slide board 15 to slide, the second motor 12 will also move. When the second motor 12 drives the rotary disc 3 to rotate, the rotary disc 3 will rotate with the convex part as the axial centre. In this preferred embodiment, the diameter of the driving gear is smaller than that of the driving gear.

The third motor 13 is installed on the frame structure 2, the slide base plate slides on the frame structure, the drive axis of the third motor 13 is connected to the slide base plate, and the third motor 13 drives the slide base plate to slide back and forth in the direction of the slide board 15 on the slide base plate. The first motor 11 is arranged on the slide base plate, the third motor 13 slides on the slide base plate, and the first motor 11 slides on the slide base plate 15 and drives the first motor 11 to slide. The slide base plate slides back and forth; when the slide base plate slides forward, it will drive the first motor 11 to approach the slide base plate 15, and when the slide base plate slides backward, it will drive the first motor to break away from the slide base plate 15.

The front end of the rotary disc 3 is provided with a plurality of axis head chambers 17 and axial heads are arranged inside the axis head chambers 17. One end of the axis head is fitted with a learning cutter head that will learn the original key shape and a processing cutter head that will process the key blank; the other end of the axis head is fitted with the first connecting part. The drive axis of the first motor 11 is fitted with a second connecting part that matches the first connecting part; the first connecting part and the second connecting part work in tandem with one another and thus, the first motor 11 drives one cutter head 4 to work. When the slide base plate slides forward, the second connecting part will stretch into an axial head chamber so that the second connecting part and the first connecting part will engage. Afterwards, the first motor 11 will work and cause one corresponding processing cutter head to work, using the second connecting part, the first connecting part and the axial head.

The user can rotate the rotary disc 3 to switch between different cutter heads 4 that will correspond to the first motor 11, which will perform an automatic change of the cutter head 4, resolving the problem of the key processing cutter that needs to be manually replaced. In detail, the rotary disc 3 is fitted with a learning cutter head; the learning cutter head will learn the shape of the original key, and then the rotary disc 3 is rotated to make the processing cutter head process the key blank that needs processing.

In this preferred embodiment, when the third motor 13 drives the slide base plate to slide in the first direction, the second connecting part will disengage from the first connecting part, then the second motor 12 drives the rotary disc 3 to rotate so that the first connecting part in one axis head chamber of the plurality of axis head chambers 17 will correspond to the second connecting part of the first motor 11.

In this preferred embodiment, the third motor 13 drives the slide base plate to slide in the second direction, which is the direction opposite to the first direction. The first connecting part will engage the second connecting part, the first motor 11 will drive one corresponding cutter head 4 to work, and the fourth motor 14 drives the slide base plate 15 to slide in the slide groove 16 so that one corresponding cutter head 4 will process the key. The machine will propel the cutter head to process the key blank through the interaction between the third motor 13, the first motor 11 and the fourth motor 12.

In this preferred embodiment, the first connecting part can be fitted with an external spline and the second connecting part can be fitted with an internal spline.

In this preferred embodiment, the front end of the rotary disc 3 has an installation part with an oblique surface, and a plurality of axis head chambers 17 are evenly arranged on the installation part, that is, the cutter heads are mounted on the installation part so that the cutter heads installed on the rotary disc 3 can easily process the key.

In this preferred embodiment, both sides of the slide board 15 are fitted with slide strips that match the slide groove 16. The slide strips and the slide groove 16 work together to make the slide board 15 slide on the slide groove 16.

In this preferred embodiment, a plurality of axis head chambers 17 are arranged with even spacing, and a lightening through hole 18 is set between two axis head chambers 17. The lightening through hole 18 is in place to reduce the weight of the rotary disc 3 and reduce the power of the second motor 12.

In this preferred embodiment, the frame structure 2 is fitted with an optical sensor, and the slide base plate is fitted with a sensor chip. When the optical sensor senses the sensor chip, the optical sensor will limit the movement of the first motor 11.

In this preferred embodiment, the upper end and the lower end of the base 1 are fitted with an upper limit switch and a lower limit switch respectively, and the upper end and the lower end of the frame structure are fitted with an upper limit strip and a lower limit strip. When the upper limit switch senses the upper limit strip, it will limit the upward movement of the slide board 15. When the said lower limit switch senses the said lower limit strip, it will limit the downward movement of the said slide board. The upper limit switch can prevent the slide board 15 from sliding upward out of the slide groove 16 by sensing the upper limit strip and limiting the maximum upward slide movement of the slide board 15. The lower limit switch can prevent the slide board 15 from sliding downward out of the slide groove 16 by sensing the lower limit strip and limiting the maximum downward slide movement of the slide board 15.

In this preferred embodiment, the processing cutter heads in the multiple axis head chambers 17 use different types of processing cutter heads.

In this preferred embodiment, the first motor is an external rotor motor, the second motor 12 is a stepping motor, the third motor 13 is a stepping motor and the fourth motor 14 is a stepping motor.

Figure 3:
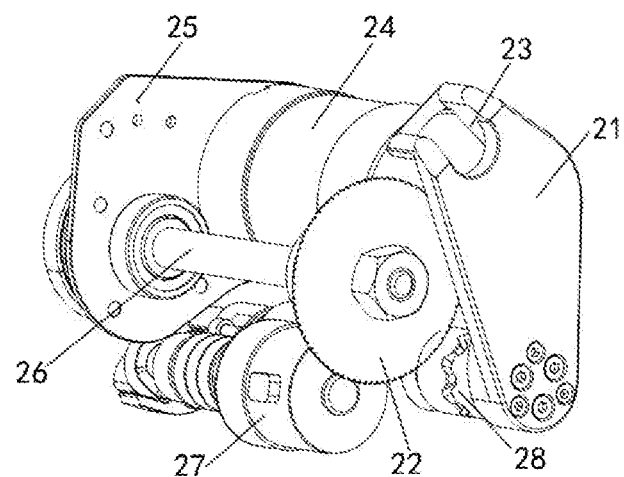
FIG. 3 shows a schematic diagram for the structure of the key bitting code learning device under this invention in a preferred embodiment.
Figure 4:
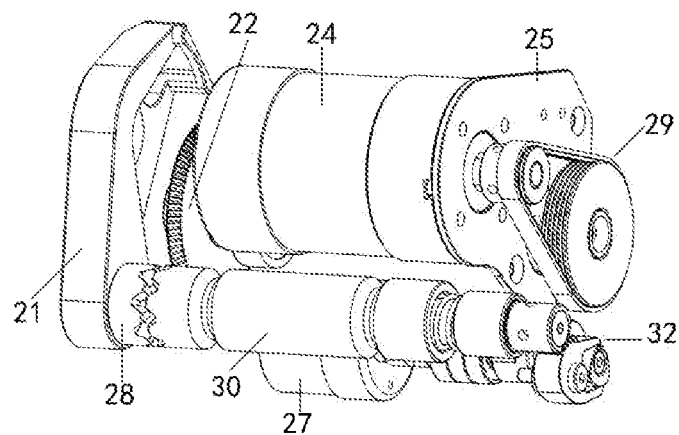
FIG. 4 shows a schematic diagram for the structure of the key bitting code learning device under this invention in a preferred embodiment.

As illustrated in FIGS. 3-4, in this preferred embodiment, the first drive component of the key bitting code learning device 200 comprises a first axis, first drive mechanism and a fifth motor 27. The fifth motor 27 drives the first axis to rotate through the first drive mechanism, one end of the cutter disc measuring head 21 is connected to the first axis, and the other end comprises a contact part 23 used to collect tooth shape data of the original key. When the first axis drives the cutter disc measuring head 21 to move, the contact part 23 will move back and forth between the position matching the original key and the position away from the original key.

In this preferred embodiment, the key bitting code learning device 200 also comprises a processing cutter disc 22: the processing cutter disc 22 is used to process the key blank that needs processing. It looks like a ratchet wheel and the ratchet is used to make contact with the key blank and perform preliminary processing of the key blank through rapid rotation. The cutter disc measuring head 21 is used to collect the original key tooth shape data and comprises a contact part 23. The contact part 23 is arranged at one end of the cutter disc measuring head 21 and shaped into a semi-circle with an outward opening; the contact part 23 comprises a conducting strip, and the conducting strip is arranged on the circular inner wall.

In this preferred embodiment, when it is required to collect the tooth shape data of the original key and learn the shape, the cutter disc measuring head 21 will be driven by the fifth motor 27 to rotate so that the contact part 23 will reach the position that will match the original key. After obtaining the original key tooth shape data and completing the learning of the shape, the processing cutter disc 21 will be driven by the fifth motor 27 again, and the contact part 23 will rotate towards the position far away from the original key so that the processing cutter disc 22 will process the key blank later.

In this preferred embodiment, the key bitting code learning device 200 also comprises a second drive component: the second drive component comprises a second axis, a second transmission mechanism 29 and a sixth motor 24. The sixth motor 24 is a selected direct-current brushless motor connected to the second transmission mechanism, and the second transmission mechanism is connected to the second axis. After obtaining the tooth shape data of the original key, the cutter disc measuring head 21 will leave the position of the original key, and process the tooth shape data of the original key it has collected in order to process the key that needs processing later. It will start the sixth motor 24 and drive the second transmission mechanism to make the second axis start rotary movement. In detail, the processing cutter disc 22 is fixed on the second axis to make the second axis rotate, and the processing cutter disc 22 also rotates to work. When the ratchet of the processing cutter disc 22 touches the key blank, it will perform preliminary processing of the key blank.

In particular, the said second transmission mechanism is a belt transmission mechanism that is arranged at the top end of the second axis and the sixth motor 24, forming a belt transmission. In this preferred embodiment, one end of the second axis is connected to the processing cutter disc 22, and the other end is connected to the belt transmission mechanism, that is, the belt transmission mechanism is located at the end far away from the processing cutter disc 22.

Compared to traditional key bitting code learning devices, the key bitting code learning device 200 described above does not need to have an additional benchmark calibration structure or need additional manual operation, which enhances convenience and efficiency in use. In addition, it no longer employs vertical or horizontal processing with the cutter disc, but instead carries out key shape learning and processing from the side, which will make it more flexible in use and achieve a higher overall learning precision.

In a preferred embodiment, to form a more stable connection between different parts of the second drive component, the said second drive component also comprises a fixing plate 25. The second axis 25 and the sixth motor 24 are arranged in parallel in the axial direction on one side of the fixing plate 25. One end of the second axis 26 and one end of the axial centre of the sixth motor 24 both cross the fixing plate vertically and are connected to the other side of the fixing plate 25 through the second transmission mechanism, that is, the second transmission mechanism and the sixth motor 24 are arranged on both sides of the fixing plate 25.

In a preferred embodiment, the said first drive component also comprises an axis cover 30 and an end surface gear 28. The first axis and the fifth motor 27 are arranged parallel in the axial direction and the axis cover 30 is fixed on the first axis. One end surface of the axis cover 30 is a tooth shape end surface; the tooth shape end surface and the tooth shape of the end surface gear 28 match. One end of the end surface gear 28 is rigidly connected to the cutter disc measuring head 21 and the end surface at the other end matches and abuts the tooth shape end surface of the axis cover 30, that is, the end of the end surface gear 28 with the tooth shape abuts the axis cover 30. When the first axis drives the axis cover 30 to rotate, the axis cover 30 will drive the cutter disc measuring head 21 to rotate through the end surface gear 28. In this preferred embodiment, the axis cover 30 is arranged around the first axis, with one end extending outside of the first axis and abutting the tooth shape end surface. In another preferred embodiment, the first axis is fixed on the key processing machine; the axis cover 30, the end surface gear 28 and the cutter disc measuring head 21 are all arranged around the first axis and can rotate around the first axis. The first drive mechanism drives the axis cover, the axis cover 30 drives the end surface gear 28, and the end surface gear 28 drives the cutter disc measuring head 21 to make it move back and forth between the position matching the original key and the position far away from the original key.

In a preferred embodiment, the said first drive mechanism 32 comprises a rotary cam 321, a drive block 322 and a gear 323. The drive block 322 comprises a nesting part and a tooth shape part, where the nesting part is flexibly arranged along the perimeter of the rotary cam 321, i.e. they can move in relation to one another. The rotary cam 321 has a round convex part; the rotary cam 321 is fixed at one end of the axial centre of the fifth motor 27 and the convex part contacts the inner wall of the nesting part. When the fifth motor 27 works, its axial centre will drive the rotary cam 321, and the rotary cam 321 has a convex part. Therefore, when the rotary cam 321 rotates, it will drive the drive block 322 through the nesting part, the tooth shape part of the drive block 322 will occlude with the gear 323 so that they will rotate in relation to one another, and the gear 323 is rigidly connected to the first axis 36. When moving, the gear 323 will drive the first axis 36, and preferably, the said gear 323 is a fan gear, and the tooth shape part of the corresponding drive block 322 can be a fan tooth shape that matches the fan gear. More specifically, the drive block 322 comprises a semi-circular column body with a thin chip shape: the side of the semi-circular column is the semi-arc end surface of the body, the tooth shape part is formed by the semi-arc end surface that protrudes outward to match the gear 323, and the tooth-shaped extension width corresponds to the aforesaid fan gear. In this preferred embodiment, the nesting part consists of two clamping arms that extend outward at one end of the body opposite to the semi-arc end surface, and the clamping arms are nested around the perimeter of the rotary cam 321.

In a preferred embodiment, the key bitting code learning device 200 also includes a first sensor, and the first sensor is arranged between the cutter disc measuring head 21 and the sixth motor 24. When the cutter disc measuring head 21 moves towards the original key and reaches the position matching the original key, the first sensor will detect whether the cutter disc measuring head 21 is in place at this time, namely, it will check whether the cutter disc measuring head 21 has reached the preset position. If not, it will adjust the cutter disc measuring head 21 to obtain more precise tooth shape data of the original key.

In a preferred embodiment, the said key bitting code learning device 200 also includes a second sensor which is arranged on one side of the first drive mechanism 32. In this preferred embodiment, it can be located between the belt transmission mechanism and the rotary cam 321. The second sensor is used to detect the location of the rotary cam 321 and judge whether the rotary cam 321 is in place when the cutter disc measuring head 21 remains in the position far away from the original key, based on the location of the rotary cam 321.

The said first sensor and the second sensor can serve as a location detection sensor, and are not limited here.

In another preferred embodiment, the key bitting code learning device 200 of the said key processing machine also comprises a frame, a motor rack 33, a bearing cushion 34 and a combined concave gear 35. The frame is arranged on the key processing machine and close to the position of the clamp component 300. In detail, the frame is provided with a second open groove that matches the second drive component and a first open groove that matches the first drive component; the two open grooves are concave and convex respectively. The second drive component is arranged in the second open groove and fixed on the frame. The first drive component is arranged on the first open groove and fixed on the frame, where the first axis 36 crosses the side wall of the first open groove, extends towards the side and is connected to the cutter disc measuring head 21, so that the cutter disc measuring head 21 will be located on the side of the first open groove; the aforesaid device is fixed on the key processing machine.

Figure 5:
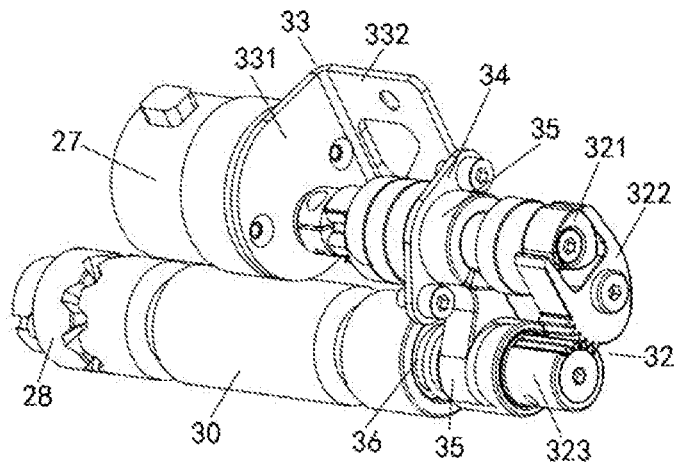
FIG. 5 shows a schematic diagram for the structure of the key bitting code learning device under this invention in a preferred embodiment.

As illustrated in FIGS. 3-5, the motor rack 33 comprises a motor connecting part 331 and a frame connecting part 332. In this preferred embodiment, the motor connecting part 331 and the frame connecting part 332 are two plates that are vertically connected. The motor connecting part 331 is flexibly arranged around the axial centre of the fifth motor 27 and the frame connecting part 332 is rigidly connected to the frame.

To further consolidate the first drive component, there are two combined concave gears 35 that are tabular. One is arranged around the first axis 36 between the axis cover 30 and the gear 323; the other is arranged around the perimeter of the axial centre of the fifth motor 27 between the motor rack 33 and the first drive mechanism 32. The said bearing cushion 34 is arranged around the axial centre of the first motor 27 between the motor rack 33 and the combined concave gear 35.

In this preferred embodiment, one side of the drive block is a semi-arc. The nesting part consists of two clamping arms that stretch outward from the said drive block 322. The tooth shape part consists of a semi-arc end surface of the drive block 322 protruding outward and the tooth shape of the gear 323.

Figure 6:
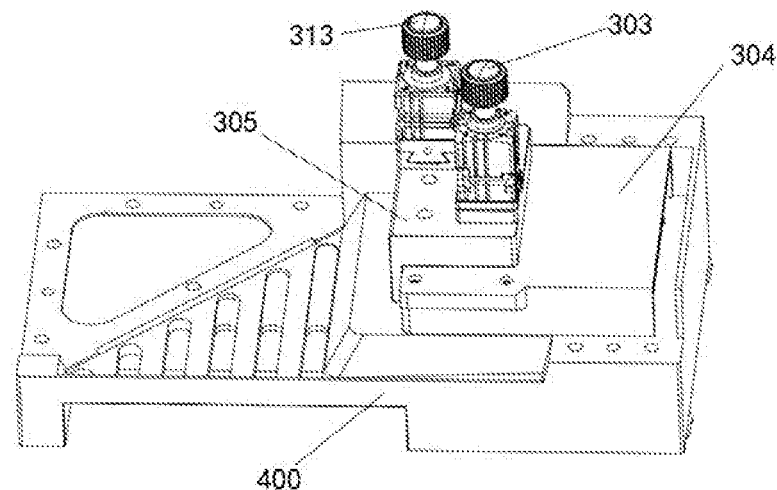
FIG. 6 shows a schematic diagram for the structure of a clamp component under this invention in a preferred embodiment.
Figure 7:
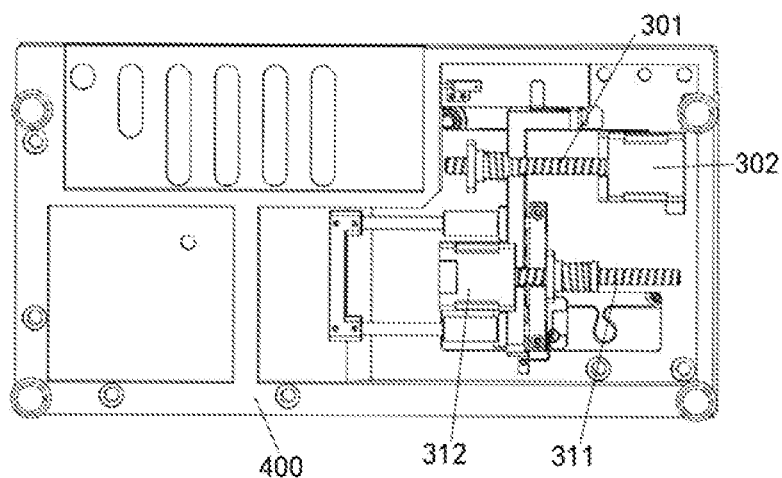
FIG. 7 shows an upward view of a clamp component under this invention in a preferred embodiment.

As illustrated in FIGS. 6-7, in this preferred embodiment, the fixing device comprises a first movable bench 305, a second movable bench 304 and a fixing clamp used to hold in place the original key or the key blank that needs processing. The fixing clamp is fixed on the first movable bench 305, the first movable bench is flexibly installed on the second movable bench 304, and the second movable bench 304 is flexibly mounted on the base 400. When the first movable bench 305 moves left or right along the second movable bench 304 in the horizontal direction to approach or break away from the key shape bitting code device 200, it will drive the said fixing clamp to move in the horizontal direction. When the second movable bench 304 moves back and forth in the horizontal direction of the base 400, it will drive the first movable bench 305 and the said fixing clamp to move. At the bottom of the clamp component 300 is a stepping motor that is used to drive the fixing device of the clamp component 300 to slide along the horizontal surface, so that the key blank clamped by the clamp component 300 and the cutter head 4 on the automatic cutter change device 100 will work together to process the key. At the same time, the original key clamped on the clamp component 300 and the cutter disc measuring head 21 on the key bitting code learning device 200 will work together to learn the shape of the key, and then the processing cutter disc 22 of the key bitting code learning device 200 will process the key blank that needs processing to produce a duplicated key that is the same as the original key.

In this preferred embodiment, the fixing clamp comprises a fixing clamp 303 and a second clamp 313. The first clamp 303 used to clamp the original key or the key blank that needs processing matches the key bitting code learning device 200 through the first movable bench 305 and the second movable bench 304, so that the key bitting code learning device 200 will learn the shape of the original key and then process the key blank that needs processing. The second clamp 313 used to clamp another original key or key blank that needs processing matches the automatic cutter change device 100 through the first movable bench 305 and the second movable bench 304, so that the automatic cutter change device 100 will learn the shape of the original key and then process the key blank that needs processing. The first movable bench 305 can drive the first clamp 303 and the second clamp 313 to move horizontally back and forth; the second movable bench 304 can drive the first movable bench 305 to move horizontally left or right. More specifically, the horizontal movement towards or away from the key bitting code learning device 200 is the horizontal movement left or right, and the movement perpendicular to the horizontal movement left or right is the horizontal movement back and forth.

The second motor unit comprises a seventh motor 302 and an eighth motor 312, where the seventh motor 302 and the screw rod 301 form the first screw rod stepping motor, and the eighth motor 312 and the screw rod 311 form the second screw rod stepping motor. The first screw rod stepping motor drives the second movable bench 304 to move, and the second screw rod stepping motor drives the first movable bench 305 to move, so that the first clamp 303 will align with the key bitting code learning device 200 or the second clamp 303 will align with the automatic cutter change device 100.

In this preferred embodiment, the first clamp 303 and the second clamp 313 are both cylindrical clamps that can rotate along the centre axis. The surfaces of the clamps in each direction are provided with different tooth shapes that are used to clamp keys of different shapes. Different surfaces that clamp different types of keys are combined with the automatic cutter change device 100 or the key bitting code learning device 200, in order to learn and process various keys. The bottom of the first clamp 303 is equipped with a rotary motor which drives the said first clamp 303 to rotate; the bottom of the second clamp 313 is also equipped with a rotary motor which drives the said second clamp 313 to rotate.

One key processing machine provided by this invention has the following benefits: the automatic cutter change device 100 or the key bitting code learning device 200 matches the clamp component 300 to put the original key and the key blank to be processed in the clamp component 300; the key bitting code learning device 200 or the automatic cutter change device 100 learns the tooth shape of the original key and then processes the key blank that needs processing, enabling the machine to process different types of keys with full automation, thereby saving human resources and increasing working efficiency.

The above description of the preferred embodiment of the key processing machine does not limit the scope of protection of the present invention. Any equivalent structure or equivalent flow with this specification and contents of the attached drawings, or direct or indirect use of the same in other related technical areas shall fall under the scope of patent protection of the present invention by the same token.

The above description of preferred embodiments of the clam does not limit the scope of protection of the present solution. Any equivalent structure or equivalent flow with this specification and contents of the attached drawings, or direct or indirect use of the same in other related technical areas shall fall under the scope of patent protection of this disclosure by the same token.

While the present solution has been described at some length and with some particularity with respect to the several described embodiments, it is not intended that it should be limited to any such particulars or embodiments or any particular embodiment, but it is to be construed with references to the appended claims so as to provide the broadest possible interpretation of such claims in view of the prior art and, therefore, to effectively encompass the intended scope of the disclosure. Furthermore, the foregoing describes the solution in terms of embodiments foreseen by the inventor for which an enabling description was available, notwithstanding that insubstantial modifications of the solution, not presently foreseen, may nonetheless represent equivalents thereto.

The invention claimed is:

1. A key processing machine, comprising:
an automatic cutter change device;
a key bitting code learning device;
a clamp component; and
a base;
wherein the automatic cutter change device comprises:
    a frame structure;
    a series of learning cutter heads;
    a processing cutter head;
    a rotary turret; and
    a first motor unit;
    wherein the rotary turret comprises a plurality of head receiving chambers;
    wherein the series of learning cutter heads and the processing cutter head are each installed in a respective one of the plurality of head receiving chambers;
    wherein the rotary turret and the first motor unit are installed on the frame structure;
    wherein the first motor unit drives the rotary turret to rotate and further drives the processing cutter head to rotate with respect to the rotary turret;
wherein the key bitting code learning device comprises:
a processing cutter disc;
a cutter disc measuring head having a contact part; and
a first drive;
    wherein one end of the cutter disc measuring head is used to bring the contact part thereof into contact with an original key that is to be duplicated;
    wherein the first drive drives the cutter disc measuring head to move and further drives the contact part to make contact with or move away from the original key;
wherein the clamp component comprises:
    a second motor unit and a fixing device;
    wherein the fixing device is used to hold in place each of the original key and a key blank that is to be cut in accordance with tooth shape data of the original key;
    wherein the second motor unit drives the fixing device to move in a horizontal plane;
wherein the base is fitted with the automatic cutter change device,
wherein the automatic cutter change device and the key bitting code learning device are arranged on opposing sides of the clamp component;
wherein the automatic cutter change device or the key bitting code learning device will learn the tooth shape data of the original key positioned on the clamp component and will cut the key blank that is positioned on the clamp component; and
the automatic cutter change device learns the tooth shape data of the original key via the series of learning cutter heads, whereas the key bitting code learning device learns the tooth shape data of the original key via the contact part.

2. The key processing machine according to claim 1;
wherein the automatic cutter change device further comprises:
a slide base plate;
a slide board; and
a change device base;
wherein the first motor unit comprises:
a first motor;
a second motor;
a third motor; and
a fourth motor;
wherein the change device base is fitted with a slide groove;
wherein the slide board slides in the slide groove;
wherein the fourth motor is installed on the change device base;
wherein the frame structure is installed on a rear side of the slide board;
wherein a drive axis of the fourth motor is connected to the frame structure;
wherein the fourth motor drives the frame structure to make the slide board slide up and down along the slide groove;
wherein the rotary turret is installed on a front side of the slide board;
wherein the second motor is installed on the frame structure;
wherein a drive axis of the second motor is equipped with a driving gear;
wherein a rear end of the rotary turret is equipped with a driven gear matching the driving gear;
wherein the driving gear engages with the driven gear;
wherein the second motor drives the driving gear to rotate;
wherein the driving gear drives the driven gear to make the rotary turret rotate;
wherein the third motor is installed on the frame structure;
wherein the slide base plate slides on the frame structure;
wherein a drive axis of the third motor is connected to the slide base plate;
wherein the third motor drives the slide base plate to slide on the frame structure;
wherein the first motor is installed on the slide base plate,
wherein a front end of the rotary turret is provided with the plurality of head receiving chambers;
wherein the processing cutter head is fitted with an external spline;
wherein a drive axis of the first motor is fitted with an internal spline matching the external spline;
wherein the external spline and the internal spline work together so that the first motor drives the processing cutter head to work.

3. The key processing machine according to claim 2;
wherein the third motor drives the slide base plate to slide on the frame structure in a first direction and the internal spline disengages from the external spline and the second motor drives the rotary turret to rotate;
whereby the external spline in one of the plurality of head receiving chambers corresponds to the internal spline of the first motor.

4. The key processing machine according to claim 3;
wherein the third motor drives the slide base plate to slide in a second direction;
wherein the second direction is a direction opposite to the first direction;
wherein the external spline engages the internal spline, the first motor drives the processing cutter head to work, the fourth motor drives the slide base plate to slide in the slide groove,
whereby the processing cutter head processes the key blank.

5. The key processing machine according to claim 1;
wherein the first drive component comprises:
a first axis;
a first drive mechanism; and
a motor;
wherein the motor drives the first axis to rotate through the first drive mechanism;
wherein one end of the cutter disc measuring head is connected to the first axis;
wherein the other end of the cutter disc measuring head comprises the contact part that is used to collect the tooth shape data of the original key;
wherein when the cutter disc measuring head is driven to move, the contact part moves back and forth between a position contacting the original key and a position away from the original key.

6. The key processing machine according to claim 5;
wherein the first drive component further comprises:
an axis cover; and
an end surface gear;
wherein the axis cover is fixed around the first axis;
wherein an end surface at one end of the axis cover is a tooth shape end surface that matches a tooth shape of the end surface gear;
wherein one end of the end surface gear is rigidly connected to the cutter disc measuring head and an end surface at the other end of the end surface gear abuts the tooth shape end surface of the axis cover.

7. The key processing machine according to claim 5;
wherein the first drive mechanism comprises:
a rotary cam,
a drive block; and
a gear;
wherein the drive block comprises a nesting part and a tooth shape part;
wherein the nesting part is flexibly arranged along the perimeter of the rotary cam;
wherein the rotary cam is rigidly arranged at one end of the axial center of the motor;
wherein the tooth shape part matches and occludes a tooth shape of the gear;
wherein the gear is rigidly connected to the first axis.

8. The key processing machine according to claim 7;
wherein the drive block comprises a semi-arc end surface;
wherein the nesting part consists of two clamping arms that stretch outward from the drive block;
wherein the tooth shape part consists of the semi-arc end surface of the drive block protruding outward and the tooth shape of the gear.

9. The key processing machine according to claim 1;
wherein the fixing device comprises:
a first movable bench;
a second movable bench; and
a fixing clamp used to hold in place the original key or the key blank;
wherein the fixing clamp is fixed on the first movable bench;
wherein the first movable bench is flexibly installed on the second movable bench;
wherein the second movable bench is flexibly mounted on the base;
wherein the first movable bench moves left or right along the second movable bench in a horizontal direction to approach or move away from the key bitting code learning device and the first movable bench drives the fixing clamp to move in the horizontal direction;
wherein the second movable bench moves back and forth in the horizontal direction of the base and the second movable bench drives the first movable bench and the fixing clamp to move.

10. The key processing machine according to claim 9,
wherein the fixing clamp comprises:
a first clamp; and
a second clamp,
wherein the first clamp clamps the original key or the key blank, and corresponds to the key bitting code learning device through the first movable bench and the second movable bench in order for the key bitting code learning device to learn the original key tooth shape data and cut the key blank;
wherein the second clamp clamps the other of the original key and the key blank, and corresponds to the automatic cutter change device through the first movable bench and the second movable bench in order for the automatic cutter change device to learn the original key tooth shape data and cut the key blank.

* * * * *